Aug. 10, 1954  W. J. GORENFLO  2,685,755
FISHING ROD HANDLE
Filed July 28, 1952

Wilfred J. Gorenflo
INVENTOR.

Patented Aug. 10, 1954

2,685,755

UNITED STATES PATENT OFFICE 2,685,755

FISHING ROD HANDLE

Wilfred J. Gorenflo, Biloxi, Miss.

Application July 28, 1952, Serial No. 301,251

1 Claim. (Cl. 43—23)

This invention relates to an improved fishing rod and has to do with a unique handle construction contrived with the thought in mind of serving the special needs of a physically handicapped user having a single usable hand, one who, having his other hand missing, finds it difficult, if not impossible, to properly use a conventional-type fishing rod equipped with a line reel.

More specifically, the invention appertains to an especially made handle which is distinct in that it enables a one-handed user, one with an available stump or stub on his handicapped arm, to enjoy the use of a rod and reel and to have sufficient control of the latter to cope with an otherwise intolerable situation and, as a matter of fact, to learn to handle his equipment with amazing skill and resultfulness.

There has long existed the need for a fishing rod of a construction to solve the problem at hand and until now, as far as has been learned, no one has achieved the end result desired. It follows, therefore, that the present endeavor brings into being a novel handle characterized primarily by two essential features; namely, a stirrup in which the stump of the user's arm is saddled and lodged and a complemental shank, the latter being sufficiently stout and long that it may be reliably anchored and clamped between the user's body and upper portion of his arm, this in a manner without hindrance or discomfort.

In carrying out a preferred embodiment of the invention capable of achieving the desired results the improved handle is preferably a one-piece unit which is usually of wood but may be of any suitable rigid, lightweight material. The stump accommodating stirrup is situated on the underside of the handle and is ample in size to permit a substantial portion of the stump of the arm to be passed therethrough.

Then, too, it is an object of the invention to provide a shank which is sturdy, cylindrical in cross-section so that it may be oscillated in its position beneath the holding arm, the rear terminal end thereof having a knob to assist in affording the user means to prevent undesirable slippage in a forward direction.

Objects, features and advantages in addition to those specifically recited will become apparent as the description proceeds.

In the accompanying sheet of drawings wherein like numerals are employed to designate like parts throughout the views.

Briefly, and by way of general introduction to the detailed description, the subject matter of the invention is characterized primarily by a fishing rod handle having an operator supporting portion which in side elevation may be said to be P-shaped, in the sense that it represents the capital letter P. Therefore, it embodies a leg and the latter is substantially circular shaped in cross-section and has a knob-like terminal on one end which is of a diameter greater than the diameter of the leg. At the opposite end of the legs there is an opening and the latter is of a shape and size substantially corresponding to the shape and size of the wrist portion of the user's forearm. The length of leg between the knob-like terminal and the end which is provided with the stated opening corresponds substantially to the width of the user's arm so that it may be properly situated between the shoulder pit and the elbow when in use. Consequently, the leg may thus be placed and clamped or clasped between the user's arm and body with the forearm passing through the opening means whereby the latter may be used to manipulate the over-all rod and to pivot the same, using the leg as the pivot means.

Figure 1:
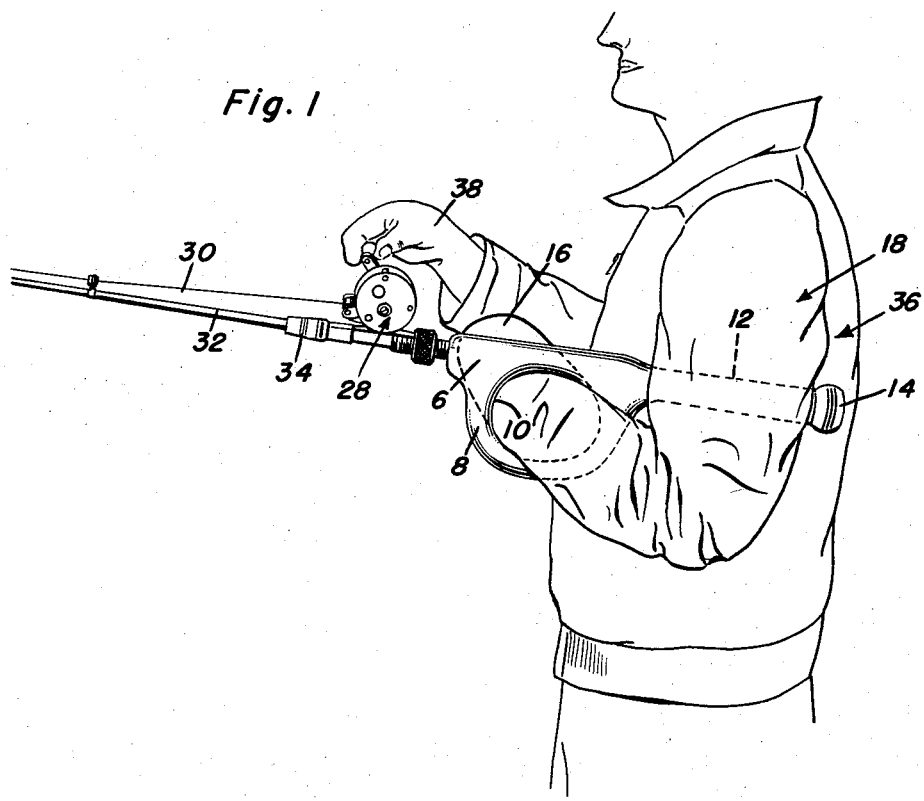
Figure 1 is a side elevation view showing the improved rod handle means and the manner in which it is held, controlled and utilized.
Figure 2:
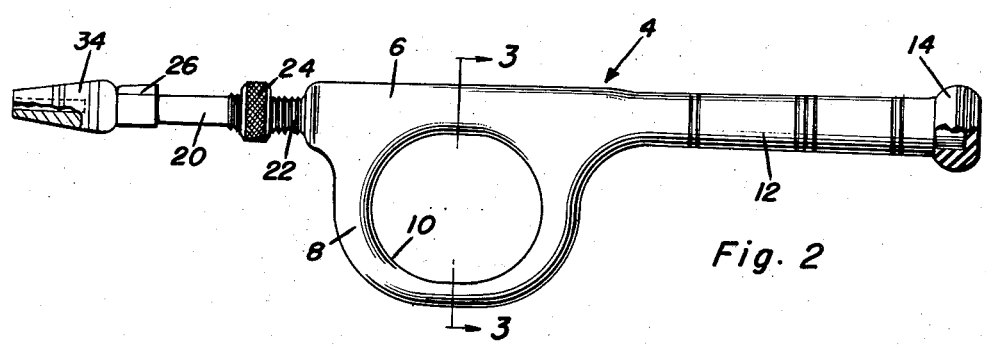
Figure 2 is an enlarged side elevational view of the same, a portion appearing in section and with the rod and reel removed.
Figure 3:
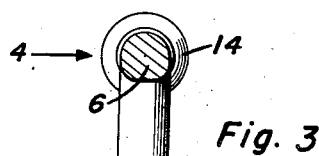
Figure 3 is a section on the vertical line 3—3 of Figure 2, looking in the direction of the arrows.

With reference to Figure 2, the handle means, in an over-all or unitary sense, is denoted by the numeral 4. The main operator supporting portion is denoted at 6 and this is, when viewed from the side, such that it represents the capital letter P, and is provided with an integral loop-shaped part which is conveniently referred to as a stirrup 8, the opening thereof being denoted at 10. This stirrup may be said to be at the forward end of the handle means. The aforementioned stout, rigid shank or leg is denoted by the numeral 12 and this is provided at its rear end with an appropriate retaining knob, head or the like 14. The shank is preferably cylindrical in cross-section and it is of a length to satisfactorily perform as one of the holding members. The stirrup is sufficiently large to permit the stub or stump 16 of the holder's left arm 18 to be lodged and thus saddled therein in the manner shown in Figure 1. The numeral 20 designates a stem having screw threads 22, a nut 24 and means 26 to accommodate and support the detachable reel 28. The line 30 is connected with the reel and also with the rod 32 and the rod fits into the socket member 34.

With reference now to the showing appearing in Figure 1, it will be evident that the rear holding means is the shank or leg 12 and the forward holding means is the opening in the loop-shaped stirrup 8. With the reel and rod fitted in place on the handle means, the complete assembly is adjusted and used in the manner illustrated. To this end the leg 12 is inserted underneath of the upper portion of the arm 18, between the elbow and arm pit, where it is clamped by the arm against the body 36. The knob end protrudes rearwardly of the forearm, the stub 16 here, is passed through and beyond the opening means 10. This double grip control on the handle means enables the latter to be aptly, conveniently and comfortably clamped and held. The handle means thus held enables the user to employ his right hand 38 in properly utilizing the reel and line. The construction shown is, of course, one in which the user by trial and error will soon learn to, not only hold the handle means, but to manipulate the same to obtain the desired fishing angle and, as a matter of fact, to eventually gain complete control much as would be the case if the user had both hands available. It is felt therefore that the instant invention is one in which manufacturers and users will find their respective needs satisfactorily met.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A fishing rod having a reel support and an operator supporting portion at the rear of the reel support, said portion when viewed from the side longitudinally having the representation of the capital letter P, the leg of which is substantially circular shaped in cross-section and has a free end of knob-like shape and of greater diameter than the general diameter of the leg, and the remainder of said supporting portion having an opening of a shape and size substantially corresponding to the shape and size of a transverse section of a portion of a human forearm, said leg being of a length between the knob-like portion and the part having said opening corresponding substantially to the width of the human arm between the shoulder pit and the elbow, whereby the leg may be placed and clasped between the latter portion of the arm and the body of the user and the remainder of the forearm may have a part thereof extending through the opening to manipulate the rod and to pivot the rod, using the leg as a pivot.

References Cited in the file of this patent

UNITED STATES PATENTS

| Number | Name | Date |
| --- | --- | --- |
| D. 128,132 | Bell | July 8, 1941 |
| 2,149,837 | Browne | Mar. 7, 1939 |
| 2,152,385 | Mayer et al. | Mar. 28, 1939 |
| 2,522,624 | Lochen | Sept. 19, 1950 |